US009725079B2

(12) United States Patent
Ishida et al.

(10) Patent No.: US 9,725,079 B2
(45) Date of Patent: Aug. 8, 2017

(54) VEHICULAR BRAKE CONTROL DEVICE

(71) Applicant: ADVICS CO., LTD., Kariya, Aichi-pref. (JP)

(72) Inventors: Yasuhito Ishida, Toyokawa (JP); Yusuke Nakagawa, Nagoya (JP); Ken Kudo, Kariya (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 0 days.

(21) Appl. No.: 14/779,422

(22) PCT Filed: Mar. 27, 2014

(86) PCT No.: PCT/JP2014/058846
§ 371 (c)(1),
(2) Date: Sep. 23, 2015

(87) PCT Pub. No.: WO2014/157513
PCT Pub. Date: Oct. 2, 2014

(65) Prior Publication Data
US 2016/0046267 A1    Feb. 18, 2016

(30) Foreign Application Priority Data

Mar. 27, 2013  (JP) .................. 2013-066010

(51) Int. Cl.
B60T 8/175       (2006.01)
B60T 13/14       (2006.01)
(Continued)

(52) U.S. Cl.
CPC .............. B60T 8/175 (2013.01); B60T 8/363 (2013.01); B60T 13/146 (2013.01);
(Continued)

(58) Field of Classification Search
None
See application file for complete search history.

(56) References Cited

U.S. PATENT DOCUMENTS 5,584,543 A * 12/1996 Sawada .................. B60T 8/175
                                                  303/156
5,806,010 A *  9/1998 Sawada .................. B60T 8/175
                                                  303/10
(Continued)

FOREIGN PATENT DOCUMENTS

JP      1-223064 A      9/1989
JP      10-59159 A      3/1998
(Continued)

OTHER PUBLICATIONS

International Search Report (PCT/ISA/210) mailed on Jul. 1, 2014, by the Japanese Patent Office as the International Searching Authority for International Application No. PCT/JP2014/058846.
(Continued)

Primary Examiner — Fadey Jabr
Assistant Examiner — Kevin P Mahne
(74) Attorney, Agent, or Firm — Buchanan Ingersoll & Rooney PC

(57) ABSTRACT

For traction control, different filters, i.e., a hydraulic-pressure-increase filter and a hydraulic-pressure-decrease filter, are provided for increasing and decreasing target pressure, respectively. The inhibiting effect that the hydraulic-pressure-increase filter exhibits with respect to target pressure changes is made less than the inhibiting effect that the hydraulic-pressure-decrease filter exhibits with respect to changes in the target pressure, and so the target pressure is increased quickly but decreased slowly. As such, even if the wheel-cylinder pressure decreases subsequent to the actual wheel-cylinder pressure having increased to follow the target pressure, the wheel-cylinder pressure decreases only
(Continued)

gradually, reducing the amount of pressure increase needed to reach the target pressure when the wheel-cylinder pressure is next increased. The wheel-cylinder pressure can thus be increased sufficiently to reach the target pressure with a high degree of responsiveness, making it possible to prevent being unable to increase the wheel-cylinder pressure accurately due to low pressurization performance.

6 Claims, 11 Drawing Sheets

(51) Int. Cl.
    *B60T 13/66*    (2006.01)
    *B60T 8/36*    (2006.01)
    *B60T 13/68*    (2006.01)

(52) U.S. Cl.
    CPC ............ *B60T 13/662* (2013.01); *B60T 13/66* (2013.01); *B60T 13/686* (2013.01)

(56) References Cited

U.S. PATENT DOCUMENTS

| | | | |
|---|---|---|---|
| 6,007,454 A | 12/1999 | Takahira et al. | |
| 6,056,372 A * | 5/2000 | Kamei | B60T 8/348 303/155 |
| 6,913,326 B1 | 7/2005 | Ohkubo et al. | |
| 2005/0027427 A1* | 2/2005 | Nagaya | B60K 28/16 701/84 |
| 2009/0024294 A1* | 1/2009 | Ishida | B60T 8/175 701/87 |
| 2009/0069995 A1* | 3/2009 | Ishida | B60T 7/22 701/93 |
| 2009/0069996 A1* | 3/2009 | Ishida | B60T 8/885 701/93 |
| 2011/0077834 A1* | 3/2011 | Kudo | B60T 8/1764 701/72 |
| 2011/0246017 A1* | 10/2011 | Koto | B60T 8/17554 701/31.4 |
| 2014/0257664 A1* | 9/2014 | Arbitmann | B60T 1/10 701/71 |

FOREIGN PATENT DOCUMENTS

| | | |
|---|---|---|
| JP | 10-157603 A | 6/1998 |
| JP | 11-139288 A | 5/1999 |
| JP | 2000-95094 A | 4/2000 |
| JP | 2005-335411 A | 12/2005 |
| JP | 2011-157038 A | 8/2011 |

OTHER PUBLICATIONS

Written Opinion (PCT/ISA/237) mailed on Jul. 1, 2014, by the Japanese Patent Office as the International Searching Authority for International Application No. PCT/JP2014/058846.

* cited by examiner

FIG.2B

| | |
|---|---|
| 20 | DIFFERENTIAL PRESSURE CONTROL VALVE |
| 30,31 | PRESSURE INCREASE CONTROL VALVE |
| 32,33 | PRESSURE DECREASE CONTROL VALVE |
| 11 | MOTOR |
| 50 | BRAKE ECU |
| 51a,51b,51c,51d | WHEEL VELOCITY SENSOR |
| 53 | ACCELERATION SENSOR |

FIG.3B

S100
<INPUT PROCESSING>
OBTAIN WHEEL VELOCITY (VWFR, VWFL, VWRR, AND VWRL),
WHEEL ACCELERATION (DVWFR, DVWFL, DVWRR, AND DVWRL),
ANTEROPOSTERIOR G (Gx), AND
DRIVING TORQUE OF EACH WHEEL (TRQFR, TRQFL, TRQRR, AND TRQRL)

S105
<BASIC CALCULATION PROCESSING>
(DRIVING TORQUE CALCULATION)
CALCULATE ACCELERATION SLIP TORQUE OF EACH WHEEL DSlipTrq** ← I ×
(DVW** − Gx)
CALCULATE SURPLUS TORQUE OF EACH WHEEL SurplusTrq ← TRQ − Iv ×
Gx − R WITH LOWER LIMIT GUARD 0 (Nm)
(WHEEL SLIP FEEDBACK CALCULATION)
ESTIMATED VEHICLE VELOCITY V0
TRC TARGET VELOCITY DEVIATION TV
CALCULATION OF SLIP AMOUNT SlipVw ← VW − V0 − TV
CALCULATION OF SLIP CONTROL AMOUNT TORQUE SlipFB(n) ← SlipFB(n −
1) + SlipVw** × CONTROL GAIN
(PRIOR TO CONTROL AMOUNT CALCULATION FILTER)
SLIP INHIBITION TORQUE OF EACH WHEEL SlipControlTrq ← MIN(DSlipTrq,
SurplusTrq) + SlipFB
ACCELERATION SLIP REQUIRED HYDRAULIC PRESSURE OF EACH WHEEL
DSLIP_P ← SlipControlTrq (HYDRAULIC PRESSURE CONVERSION)

S110    DSLIP_P < DSLIP_PFilter(n − 1)?
S115    FILTER COEFFICIENT K1 ← 1.0
        GRIP TIME ← 0
S120    SlipVW** < 0?
S125    FILTER COEFFICIENT K1 ← 0.01
        GRIP TIME ← 0

FIG.3C
S130
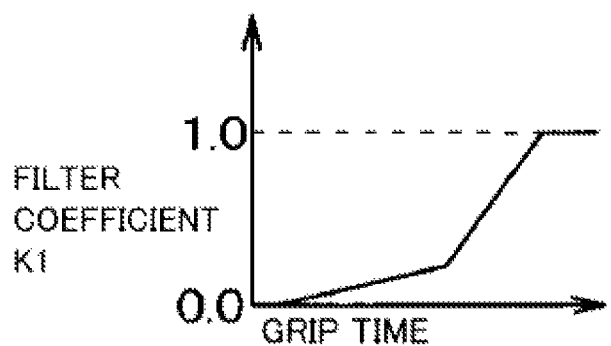
S135  UPDATE GRIP TIME (+ 1)
S140
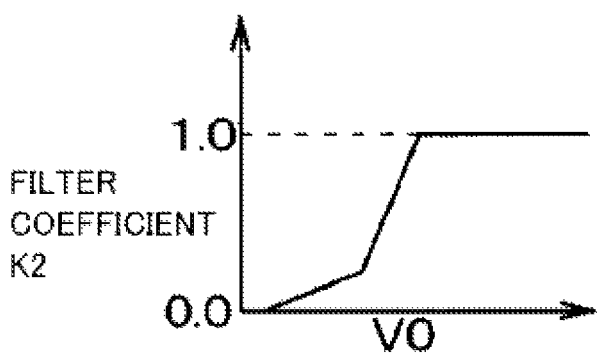
S145  K ← MAX(K1,K2)
S150  DSLIP_PFilter(n) ← K × DSLIP_P+(1 − K) × DSLIP_P**Filter(n − 1)

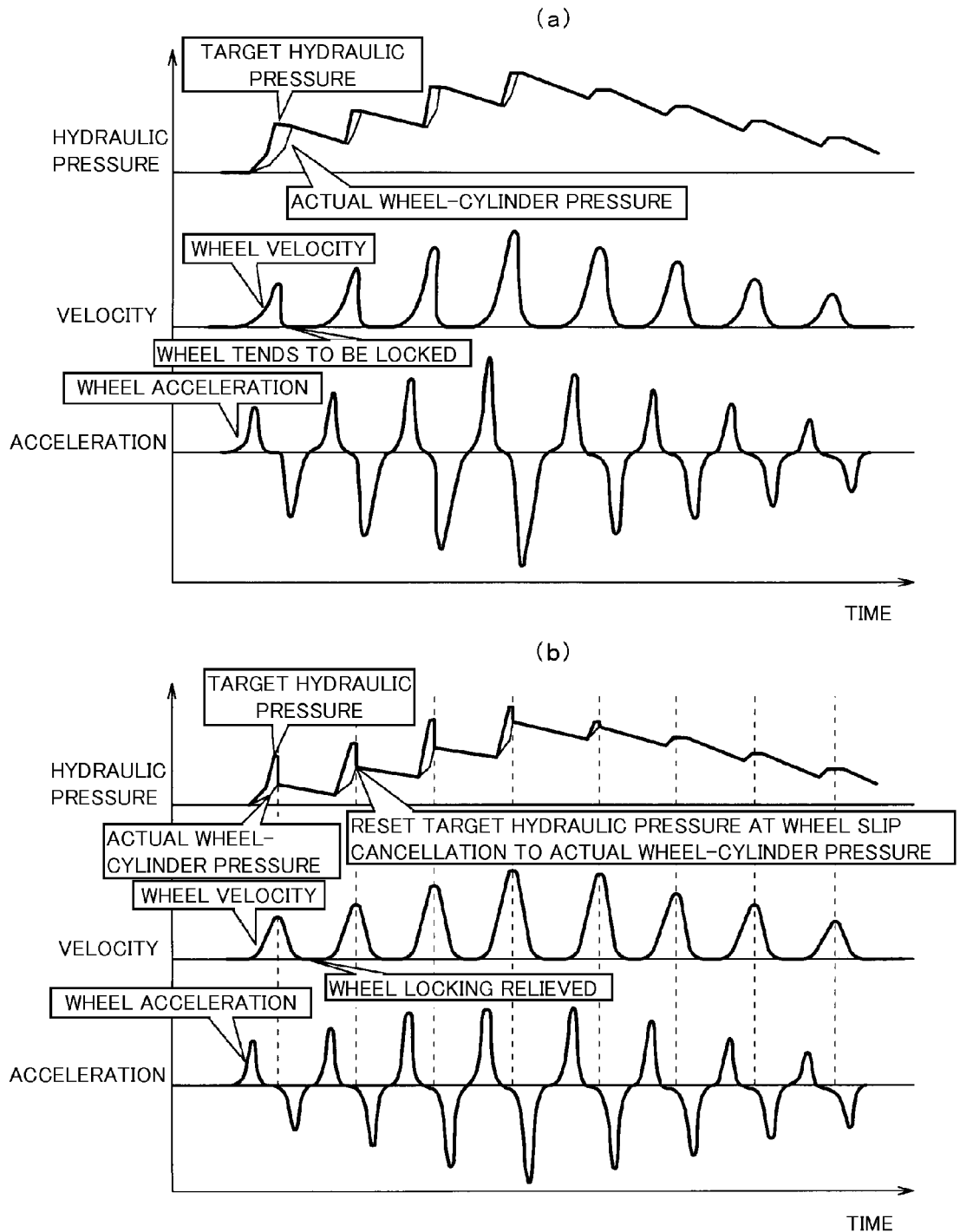

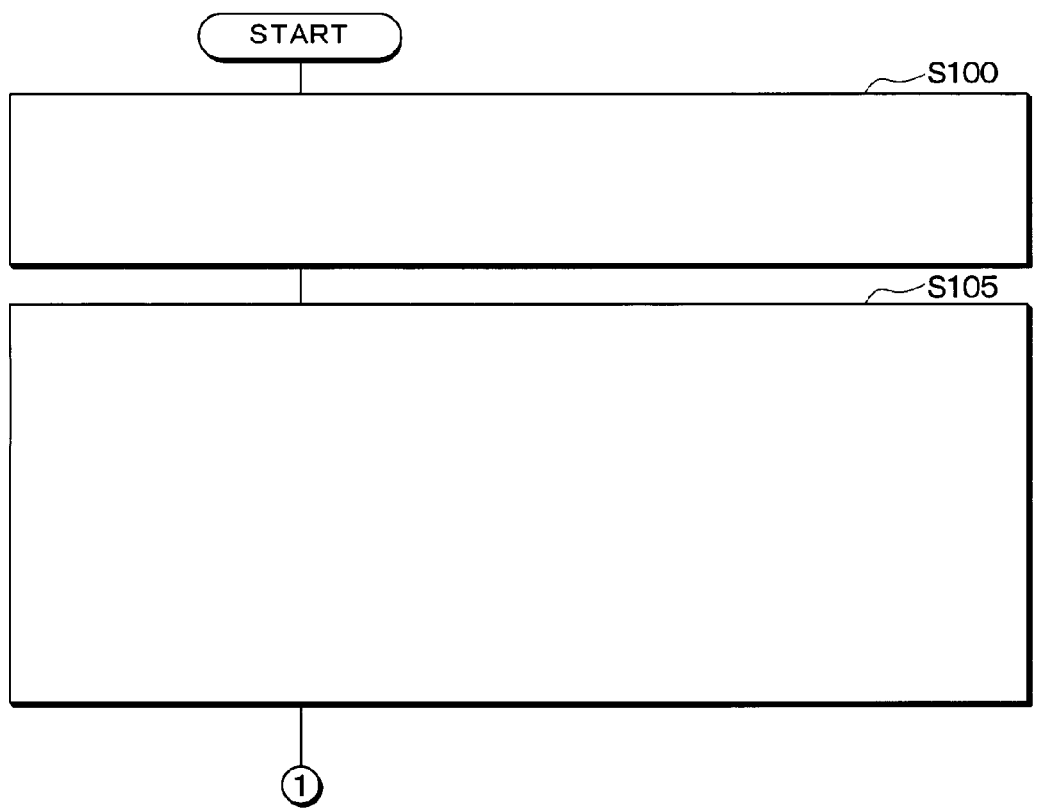

FIG.7B
S100
<INPUT PROCESSING>
OBTAIN WHEEL VELOCITY (VWFR, VWFL, VWRR, AND VWRL),
WHEEL ACCELERATION (DVWFR, DVWFL, DVWRR, AND DVWRL),
ANTEROPOSTERIOR G (Gx), AND
DRIVING TORQUE OF EACH WHEEL (TRQFR, TRQFL, TRQRR, AND TRQRL)

S105
<BASIC CALCULATION PROCESSING>
(DRIVING TORQUE CALCULATION)
CALCULATE ACCELERATION SLIP TORQUE OF EACH WHEEL DSlipTrq ← I × (DVW − Gx)
CALCULATE SURPLUS TORQUE OF EACH WHEEL SurplusTrq ← TRQ − Iv × Gx − R WITH LOWER LIMIT GUARD 0 (Nm)
(WHEEL SLIP FEEDBACK CALCULATION)
ESTIMATED VEHICLE VELOCITY V0
TRC TARGET VELOCITY DEVIATION TV
CALCULATION OF SLIP AMOUNT SlipVw ← VW − V0 − TV
CALCULATION OF SLIP CONTROL AMOUNT TORQUE SlipFB(n) ← SlipFB(n − 1) + SlipVw** × CONTROL GAIN
(PRIOR TO CONTROL AMOUNT CALCULATION FILTER)
SLIP INHIBITION TORQUE OF EACH WHEEL SlipControlTrq ← MIN(SdlipTrq, SurplusTrq) + SlipFB
ACCELERATION SLIP REQUIRED HYDRAULIC PRESSURE OF EACH WHEEL DSLIP_P ← SlipControlTrq (HYDRAULIC PRESSURE CONVERSION)

FIG.7D
S110   DSLIP_P < DSLIP_PFilter(n − 1)?
S115   FILTER COEFFICIENT K1 ← 1.0
       GRIP TIME ← 0
S120   SlipVW** < 0?
S125   FILTER COEFFICIENT K1 ← 0.01
       GRIP TIME ← 0
S130
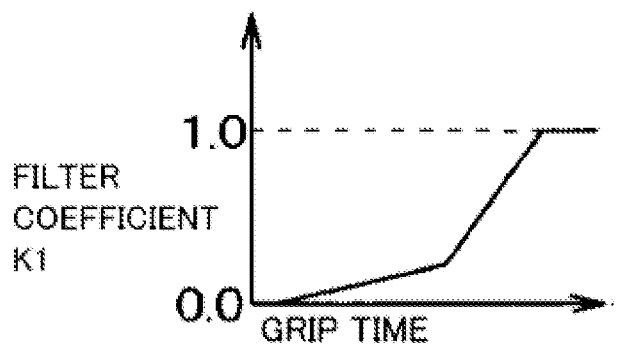
S135   UPDATE GRIP TIME (+ 1)
S140
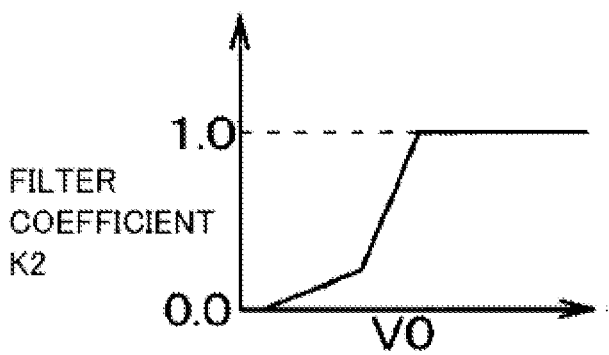
S145   K ← MAX(K1,K2)
S150   DSLIP_PFilter(n) ← K × DSLIP_P+(1 − K) × DSLIP_P**Filter(n − 1)
S160   DVW** < 0?
S165   DSLIP_P > ACTUAL WHEEL-CYLINDER PRESSURE WC?
S170   DSLIP_P ← ACTUAL WHEEL-CYLINDER PRESSURE WC
S175   FILTER COEFFICIENT K1 ← 1

VEHICULAR BRAKE CONTROL DEVICE

TECHNICAL FIELD

The present invention relates to a vehicular brake control device configured to perform vehicle brake control such as traction control by causing a brake hydraulic pressure (wheel-cylinder pressure), which is applied to a wheel cylinder (hereinafter, referred to as a wheel-cylinder) of each wheel when a motor drives a pump in a hydraulic pressure circuit, to follow a target pressure.

BACKGROUND ART

There has been conventionally proposed a vehicular brake control device configured to increase a wheel-cylinder pressure with a pump, as in Patent Literature 1 or the like. Specifically, this vehicular brake control device drives a motor to drive a pump provided in a hydraulic pressure circuit and increase a wheel-cylinder pressure in accordance with discharge of brake fluid with the pump. The vehicular brake control device performs traction control by pressurizing a wheel-cylinder of a slipping wheel and applying braking force to enable transmission of driving power to an opposite wheel provided to an axle for the wheel. The vehicular brake control device can thus perform control equivalent to differential lock of gaining traction with inhibition in velocity difference among all of the right, left, front, and rear wheels.

Meanwhile, Patent Literature 2 discloses a vehicular brake control device configured to stop driving a motor when a required hydraulic pressure change grade as a difference obtained by subtracting a preceding target pressure from a current target pressure falls within a predetermined range, in order to reduce a motor operation frequency while driving the motor and performing pump pressurization.

CITATION LIST

Patent Literature

Patent Literature 1: JP 11-139288 A
Patent Literature 2: JP 2000-95094 A

SUMMARY OF INVENTION

Technical Problems

However, if traction control mentioned in Patent Literature 1 is performed and a tire repeats slipping and gripping on a dirt road or the like, such intended traction control may not be achieved. In a case where a wheel-cylinder pressure is controlled by pump pressurization, pressurization performance is less sufficient than depressurization performance. It is thus impossible to sufficiently increase the wheel-cylinder pressure and sufficiently inhibit slip with control of repeating pressurization and depressurization. Intended traction control cannot be performed accordingly.

When performing ON-OFF control of a motor in order to reduce a motor operation frequency as in the vehicular brake control device disclosed in Patent Literature 2, low pump pressurization capacity requires longer time until a wheel-cylinder pressure reaches a target pressure.

In view of the above disadvantages, an object of the present invention is to provide a vehicular brake control device configured to inhibit a wheel-cylinder pressure from failing to increase accurately due to low pressurization performance.

Solution to Problems

In order to achieve the object mentioned above, claim 1 of the present invention provides a hydraulic pressure setting means (50) configured to set a target pressure as a target of control by the hydraulic pressure control means (10, 11, 20, 30 to 33, or 40), for the brake hydraulic pressure generated at the hydraulic pressure brake mechanism (4 or 5). The hydraulic pressure setting means includes a hydraulic-pressure-increase filter (S115) configured to regulate increase of the target pressure in accordance with an increasing change of the target pressure, and a hydraulic-pressure-decrease filter (S125 or S130) configured to regulate decrease of the target pressure in accordance with a decreasing change of the target pressure, and performs filter regulation processing of setting an effect of inhibiting the change of the target pressure by the hydraulic-pressure-increase filter to be lower than an effect of inhibiting the change of the target pressure by the hydraulic-pressure-decrease filter.

As described above, the different filters, i.e. the hydraulic-pressure-increase filter and the hydraulic-pressure-decrease filter, are provided for increasing and decreasing the target pressure, respectively. The effect of inhibiting the change of the target pressure by the hydraulic-pressure-increase filter is made smaller than the effect of inhibiting the change of the target pressure by the hydraulic-pressure-decrease filter, so that the target pressure is increased quickly but is decreased slowly.

Accordingly, even if the target pressure is decreased after the brake hydraulic pressure of the hydraulic pressure brake mechanism increases to follow the target pressure, the actual wheel-cylinder pressure decreases only gradually. This reduces a pressure increase amount required to cause the brake hydraulic pressure of the hydraulic pressure brake mechanism to increases to the target pressure when the target pressure is increased subsequently. The brake hydraulic pressure of the hydraulic pressure brake mechanism can thus be increased sufficiently to reach the target pressure with a high degree of responsiveness in a case where pump pressurization has high pressurization capacity as well as in a case where pump pressurization has low pressurization capacity. It is accordingly possible to inhibit the brake hydraulic pressure of the hydraulic pressure brake mechanism from failing to increase accurately due to low pressurization performance.

According to the present invention, the hydraulic pressure control means has a regular control state for controlling increase of the brake hydraulic pressure generated at the hydraulic pressure brake mechanism with regular pressurization performance and an inhibited control state with pressurization performance lower than the pressurization performance in the regular control state, to increase the brake hydraulic pressure, and the hydraulic pressure setting means performs the filter regulation processing in the inhibited control state.

As described above, comparing the case where pump pressurization is controlled with regular pressurization performance in the regular control state with the case where pump pressurization is controlled with lower pressurization performance in the inhibited control state, the pressurization performance in the inhibited control state is lower than the pressurization performance in the regular control state. It is thus preferred to perform the filter regulation processing in such a case because the brake hydraulic pressure of the hydraulic pressure brake mechanism can reach the target pressure with a high degree of responsiveness.

According to the present invention, the hydraulic pressure setting means performs the filter regulation processing in the inhibited control state to increase, in comparison to the regular control state, a difference between the effect of inhibiting the change of the target pressure by the hydraulic-pressure-increase filter and the effect of inhibiting the change of the target pressure by the hydraulic-pressure-decrease filter.

Also in this configuration, the brake hydraulic pressure of the hydraulic pressure brake mechanism can reach the target pressure with a high degree of responsiveness in the inhibited control state as well as in the regular control state.

According to the present invention, the target pressure is set in proportion to slip torque of each wheel (DSlipTrq**) obtained from a wheel inertia moment (I) as an inertia moment of a rotary member in the vehicle including the wheel and angular velocity ($\alpha$) of the rotary member.

As described above, the target pressure can be set more quickly not by feeding back the brake hydraulic pressure actually generated at the hydraulic pressure brake mechanism but by calculating the slip torque (DSlipTrq**) with feedforward in accordance with a rotation motion equation.

According to the present invention, the target pressure is set in proportion to surplus torque (SurplusTrq) of the wheel calculated based on vehicle acceleration torque that is calculated from driving torque (TRQ) for driving the wheel and vehicle longitudinal acceleration (Gx) and on travel resistance torque.

As descried above, the target pressure can be set more quickly because the surplus torque (SurplusTrq) can be calculated with feedforward even in the case where the surplus torque (SurplusTrq) is referred to.

According to the present invention, when the wheel grips, in comparison to a case where the wheel slips, the hydraulic pressure setting means performs the filter regulation processing to decrease the difference between the effect of inhibiting the change of the target pressure by the hydraulic-pressure-increase filter and the effect of inhibiting the change of the target pressure by the hydraulic-pressure-decrease filter.

As described above, the target pressure can change to decrease quickly because the gripping wheel does not slip any more. The difference between the effect of inhibiting the change of the target pressure by the hydraulic-pressure-increase filter and the effect of inhibiting the change of the target pressure by the hydraulic-pressure-decrease filter can thus be made smaller in the case where the wheel grips in comparison to the case where the wheel slips.

According to the present invention, when the vehicle has high velocity, in comparison to a case where the vehicle has low velocity, the hydraulic pressure setting means performs the filter regulation processing to decrease the difference between the effect of inhibiting the change of the target pressure by the hydraulic-pressure-increase filter and the effect of inhibiting the change of the target pressure by the hydraulic-pressure-decrease filter.

In this configuration, the target pressure can be decreased more quickly when the vehicle speed is higher. The responsiveness can thus be improved with a higher degree when the target pressure is decreased, to prevent a driver from receiving brake dragging feeling.

According to the present invention, the hydraulic pressure setting means sets the target pressure to an actual hydraulic pressure equivalent value determined in accordance with the brake hydraulic pressure when slip of the wheel is decreasing.

As described above, braking force sufficient for wheel slip cancellation is assumed to be generated when wheel slip is decreasing. Keeping the target pressure at a high level may lead to generation of excessive braking force. In view of this, when wheel slip is decreasing, the target pressure is set to a value equivalent to the brake hydraulic pressure. The target pressure can then be decreased to the value equivalent to the brake hydraulic pressure, to prevent a driver from receiving brake dragging feeling due to generation of excessive braking force and to secure control performance with sufficient braking force.

Those reference signs in parentheses respectively denoted to the means mentioned above exemplify the correspondences to specific means mentioned in the embodiments to be described later.

BRIEF DESCRIPTION OF DRAWINGS

FIG. 2B is a caption of FIG. 2A.

FIGS. 3B and 3C are captions of FIG. 3A.

FIGS. 6(a) and 6(b) are timing charts for cases of performing and not performing target hydraulic pressure reset processing described in a different embodiment.

FIG. 7A is a flowchart of detailed target pressure set processing including the target hydraulic pressure reset processing described in the different embodiment.

FIG. 7B is a caption of FIG. 7A

FIG. 7D is a caption of FIG. 7C.

DESCRIPTION OF EMBODIMENTS

The embodiments of the present invention will be described below with reference to the drawings. It is noted that same or equivalent portions are to be denoted by same reference signs in the following embodiments.

First Embodiment

Figure 1:
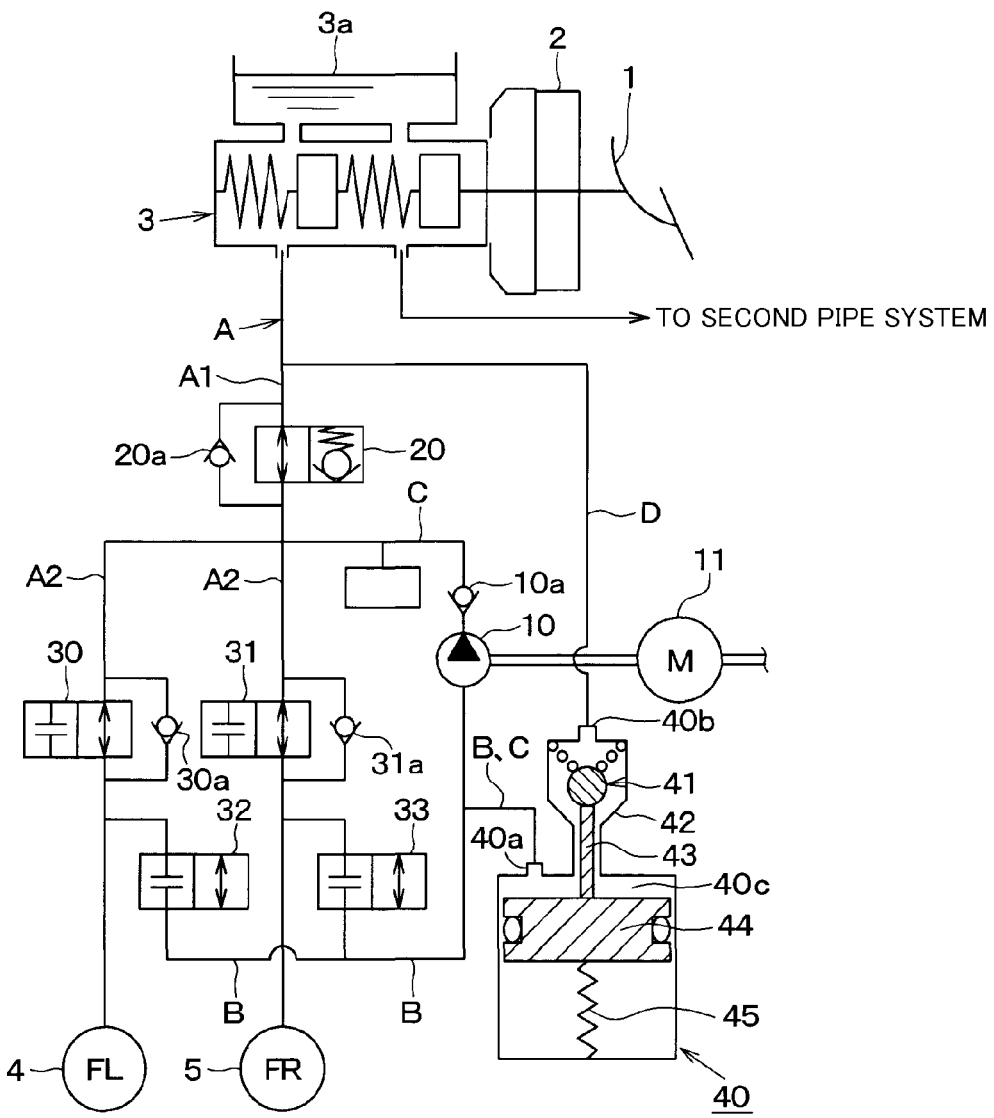
FIG. 1 is a schematic view of a vehicular brake control device according to a first embodiment of the present invention.
Figure 2A:
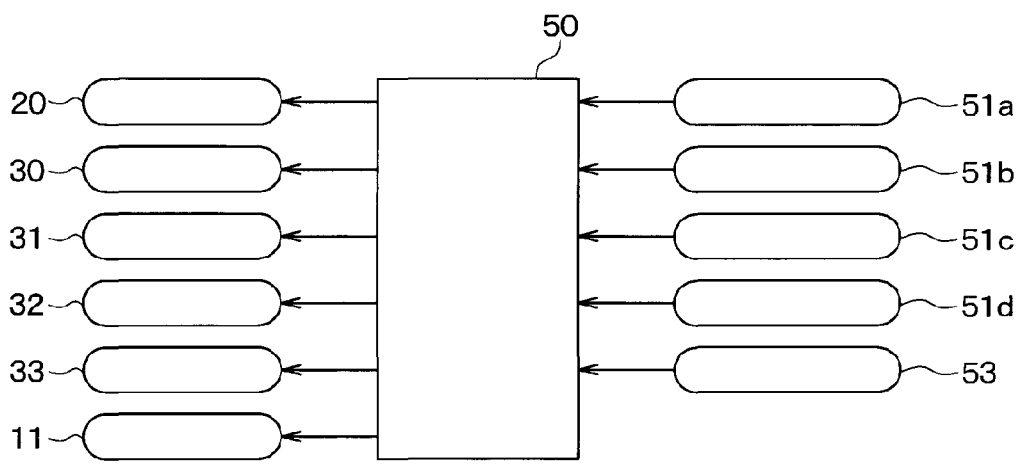
FIG. 2A is a block diagram of relations in a control system of the vehicular brake control device.

FIG. 1 is a schematic view of a vehicular brake control device according to an embodiment of the present invention. FIG. 2A is a block diagram of relations in a control system of the vehicular brake control device. A basic configuration of the vehicular brake control device according to the present embodiment will now be described with reference to these figures.

FIG. 1 depicts only a first pipe system in the vehicular brake control device, while a second pipe system is configured similarly. Described herein is a case where the vehicular brake control device according to the present embodiment is applied to a front wheel drive vehicle provided with a hydraulic pressure circuit for front and rear pipes including a front wheel pipe system and a rear wheel pipe system. The vehicular brake control device is also applicable to an X pipe and the like.

As depicted in FIG. 1, a brake pedal 1 is connected with a booster 2 configured to boost a brake pedal pressure or the like. The booster 2 includes a push rod or the like configured to transmit boosted pedal force to a master cylinder (hereinafter, referred to as a master-cylinder) 3. The push rod is configured to press a master piston provided to the master-cylinder 3 to generate a master-cylinder pressure. The master-cylinder pressure is transmitted to a wheel-cylinder 4 for a front left wheel FL and a wheel-cylinder 5 for a front right wheel FR by way of a brake hydraulic pressure control actuator configured to perform antilock braking (hereinafter, referred to as ABS) control and the like. The master-cylinder 3 is connected with a master reservoir 3a so as to supply brake fluid into the master-cylinder 3 and store surplus brake fluid in the master-cylinder 3. In the present embodiment, the wheel-cylinders 4 and 5 each correspond to a hydraulic pressure brake mechanism configured to generate braking force in accordance with a brake hydraulic pressure, whereas the brake hydraulic pressure control actuator corresponds to a hydraulic pressure control means configured to control a brake hydraulic pressure generated at the hydraulic pressure brake mechanism.

The first pipe system for the front right wheel FR and the front left wheel FL will be described below. The second pipe system for a rear left wheel RL and a rear right wheel RR is configured identically.

The vehicular brake control device includes a conduit line (main conduit line) A connected to the master-cylinder 3. The conduit line A is provided with a check valve 20a and a differential pressure control valve 20 controlled by an electronic control unit for brake control (hereinafter, referred to as a brake ECU) 50 depicted in FIGS. 2A and 2B. The differential pressure control valve 20 divides the conduit line A into two sections. Specifically, the conduit line A is divided into a conduit line A1 configured to receive a master-cylinder pressure from the master-cylinder 3 to the differential pressure control valve 20 and a conduit line A2 from the differential pressure control valve 20 to the wheel-cylinders 4 and 5.

The differential pressure control valve 20 is regularly in a communicating state but comes into a state for generating a predetermined differential pressure (a differential pressure state) between the master-cylinder and the wheel-cylinder when a wheel-cylinder pressure more than the master-cylinder pressure is generated at the wheel-cylinder 4 or 5, when traction control is performed, or the like.

The conduit line A2 is branched to two portions. One portion has a pressure increase control valve 30 configured to control increase of the brake hydraulic pressure to the wheel-cylinder 4, whereas the other portion has a pressure increase control valve 31 configured to control increase of the brake hydraulic pressure to the wheel-cylinder 5.

These pressure increase control valves 30 and 31 are each configured as a two position valve controlled into communicating and blocking states by the brake ECU 50. When the pressure increase control valves 30 and 31 are controlled into the communicating state, the brake hydraulic pressure due to the master-cylinder pressure or discharge from a pump 10 to be described later can be applied to each of the wheel-cylinders 4 and 5. These pressure increase control valves 30 and 31 are each configured as a normally opened valve always controlled into the communicating state during normal braking at which no vehicle brake control such as ABS control or traction is being performed.

The pressure increase control valves 30 and 31 are parallelly provided with safety valves 30a and 31a, respectively, so as to remove brake fluid from the wheel-cylinders 4 and 5 when pressing the brake pedal is cancelled and ABS control terminates.

The conduit line A is connected with a conduit line (intake conduit line) B, at positions between the pressure increase control valves 30 and 31 and the wheel-cylinders 4 and 5. The conduit line B is provided with pressure decrease control valves 32 and 33 controlled into the communicating and blocking states by the brake ECU 50. These pressure decrease control valves 32 and 33 are each configured as a normally closed valve always controlled into the blocking state during normal braking (with the ABS not in operation).

The conduit line B is connected to a first reservoir hole 40a provided in a pressure regulating reservoir 40. Brake fluid is caused to flow to the pressure regulating reservoir 40 through the conduit line B during ABS control or the like so as to control the brake hydraulic pressure at each of the wheel-cylinders 4 and 5 and prevent locking tendency at each wheel.

A rotary pump 10 is provided on a conduit line (auxiliary conduit line) C connecting from a position between the differential pressure control valve 20 and the pressure increase control valves 30 and 31 on the conduit line A to the first reservoir hole 40a in the pressure regulating reservoir 40. The rotary pump 10 has a safety valve 10a provided at a discharge end and configured to prevent brake fluid from counterflowing. The rotary pump 10 is connected with a motor 11 configured to drive the rotary pump 10.

There is further provided a conduit line (auxiliary conduit line) D connecting a second reservoir hole 40b in the pressure regulating reservoir 40 and the master-cylinder 3.

The pressure regulating reservoir 40 regulates the differential pressure between the brake hydraulic pressure in the reservoir and the master-cylinder pressure, and also supplies the rotary pump 10 with brake fluid. The first and second reservoir holes 40a and 40b provided in the pressure regulating reservoir 40 are configured to communicate with a reservoir chamber 40c. The first reservoir hole 40a is connected to the conduit lines B and C so as to receive brake fluid discharged from the wheel-cylinders 4 and 5 and supply the intake end of the rotary pump 10 with brake fluid. The second reservoir hole 40b is connected to the conduit line D so as to receive brake fluid from the master-cylinder 3.

The pressure regulating reservoir 40 is provided, inside the reservoir hole 40a, with a valve body 41 configured as a ball valve or the like. This valve body 41 contacts with and is separated from a valve seat 42 to control communication and block between the conduit line D and the reservoir chamber 40c. The valve body 41 is further regulated in distance from the valve seat 42 so as to regulate the differential pressure between the internal pressure of the reservoir chamber 40c and the master-cylinder pressure. The valve body 41 is provided therebelow, separately from the valve body 41, with a rod 43 that has a predetermined stroke to vertically shift the valve body 41. The reservoir chamber 40c accommodates a piston 44 configured to operate in association with the rod 43, and a spring 45 configured to press the piston 44 toward the valve body 41 and generate force of pressing brake fluid out of the reservoir chamber 40c.

When the pressure regulating reservoir 40 thus configured contains a predetermined amount of brake fluid, the valve body 41 is seated onto the valve seat 42 so as to prevent brake fluid from flowing into the pressure regulating reservoir 40. In this configuration, brake fluid flowing into the reservoir chamber 40c does not exceed the intake amount of the rotary pump 10. Furthermore, the intake end of the rotary pump 10 does not receive a high pressure.

The brake ECU 50 corresponds to a hydraulic pressure setting means configuring the control system of the vehicular brake control device. The brake ECU 50 is provided as a microcomputer including a CPU, a ROM, a RAM, an I/O, and the like, and is configured to variously perform calculation in accordance with a program stored in the ROM or the like and perform vehicle brake control with driving the motor, such as ABS control or traction control.

As depicted in FIGS. 2A and 2B, the brake ECU 50 receives various detection signals, calculates various physical quantities, and detects a vehicle travel state in accordance with driver's operation. Specifically, the brake ECU 50 receives detection signals from wheel velocity sensors 51a to 51d provided to the wheels FL to RR and an acceleration sensor 53 configured to detect acceleration in the vehicle longitudinal direction. The brake ECU 50 obtains, from the detection signals, wheel velocity and wheel acceleration of the wheels FL to RR, vehicle velocity (estimated vehicle velocity), and vehicle longitudinal acceleration, and the like. The brake ECU 50 acquires information on driving torque of each wheel from an ECU (e.g. an engine ECU) in a drive system. The brake ECU 50 performs vehicle brake control such as ABS control or traction control in accordance with the information.

For ABS control, the brake ECU 50 determines whether or not to perform control, which one of pressurization, keeping, and depressurization of the wheel-cylinder pressure of a control target wheel to be performed, and the like. For traction control, the brake ECU 50 determines whether or not to perform control and obtains a wheel-cylinder pressure to be generated by the wheel-cylinder of a control target wheel. The brake ECU 50 controls the respective control valves 20 and 30 to 33 and the motor 11 in accordance with the results. Accordingly, ABS control includes inhibition of deceleration slip of a control target wheel, whereas traction control includes inhibition of acceleration slip of a driving wheel as a control target wheel.

In a case where the front left wheel FL is to generate a wheel-cylinder pressure as a control target wheel in traction control, the differential pressure control valve 20 is brought into the differential pressure state, the motor 11 is turned ON, and the pump 10 is driven. The brake hydraulic pressure downstream of (close to the wheel-cylinder) the differential pressure control valve 20 is thus increased in accordance with the differential pressure generated at the differential pressure control valve 20. The pressure increase control valve 31 for the front right wheel FR as a noncontrol target wheel is then brought into the blocking state so as not to pressurize the wheel-cylinder 5 and so as to provide no electric current to the pressure increase control valve 30 for the front left wheel FL as a control target wheel or regulate an amount of electric current to be provided (e.g. duty control). A desired wheel-cylinder pressure is thus generated at the wheel-cylinder 4.

The vehicular brake control device according to the present embodiment is configured as described above. Specific operation of the vehicular brake control device will be described next. This vehicular brake control device is configured to perform regular brake control as well as vehicle brake control such as ABS control or traction control. Such basic operation is performed similarly to that of a conventional device. Described herein is a method of setting a target pressure of the motor 11 driven for traction control, as the feature of the present invention.

The vehicular brake control device according to the present embodiment generates a wheel-cylinder pressure through pump pressurization during traction control. A system for generating a wheel-cylinder pressure through pump pressurization typically has insufficient pressurization performance in comparison to depressurization performance. Such a system fails to sufficiently increase the wheel-cylinder pressure and sufficiently inhibit slip with repeated increase and decrease of the wheel-cylinder pressure for traction control.

In the present embodiment, there are provided a hydraulic-pressure-increase filter configured to increase a wheel-cylinder pressure and a hydraulic-pressure-decrease filter configured to decrease a wheel-cylinder pressure for setting of a target pressure of the wheel-cylinder pressure during traction control. Filter regulation processing causes the effect of inhibiting the change of the target pressure by the hydraulic-pressure-increase filter to be smaller than the effect of inhibiting the change of the target pressure by the hydraulic-pressure-decrease filter, so that the target pressure is increased quickly but is decreased slowly. The target pressure is less likely to decrease even in a case where pump pressurization has low pressurization capacity, and is thus kept even with repeated pressurization and depressurization. A wheel-cylinder pressure actually generated (hereinafter, referred to as an actual wheel-cylinder pressure) during subsequent pressurization can be increased quickly to the target pressure.

For prevention of temperature increase and improvement in durability of the motor 11, the motor 11 may not be driven continuously during traction control but can be turned ON when necessary and be turned OFF otherwise. For example, the motor 11 can be stopped if the actual wheel-cylinder pressure reaches the target pressure and be driven if the target pressure increases again. In this case, it takes time for the actual wheel-cylinder pressure to reach the target pressure particularly if pump pressurization has low pressurization capacity. The provision of the hydraulic-pressure-increase filter and the hydraulic-pressure-decrease filter allows the actual wheel-cylinder pressure to reach the target pressure more quickly even during such control.

Figure 3A:
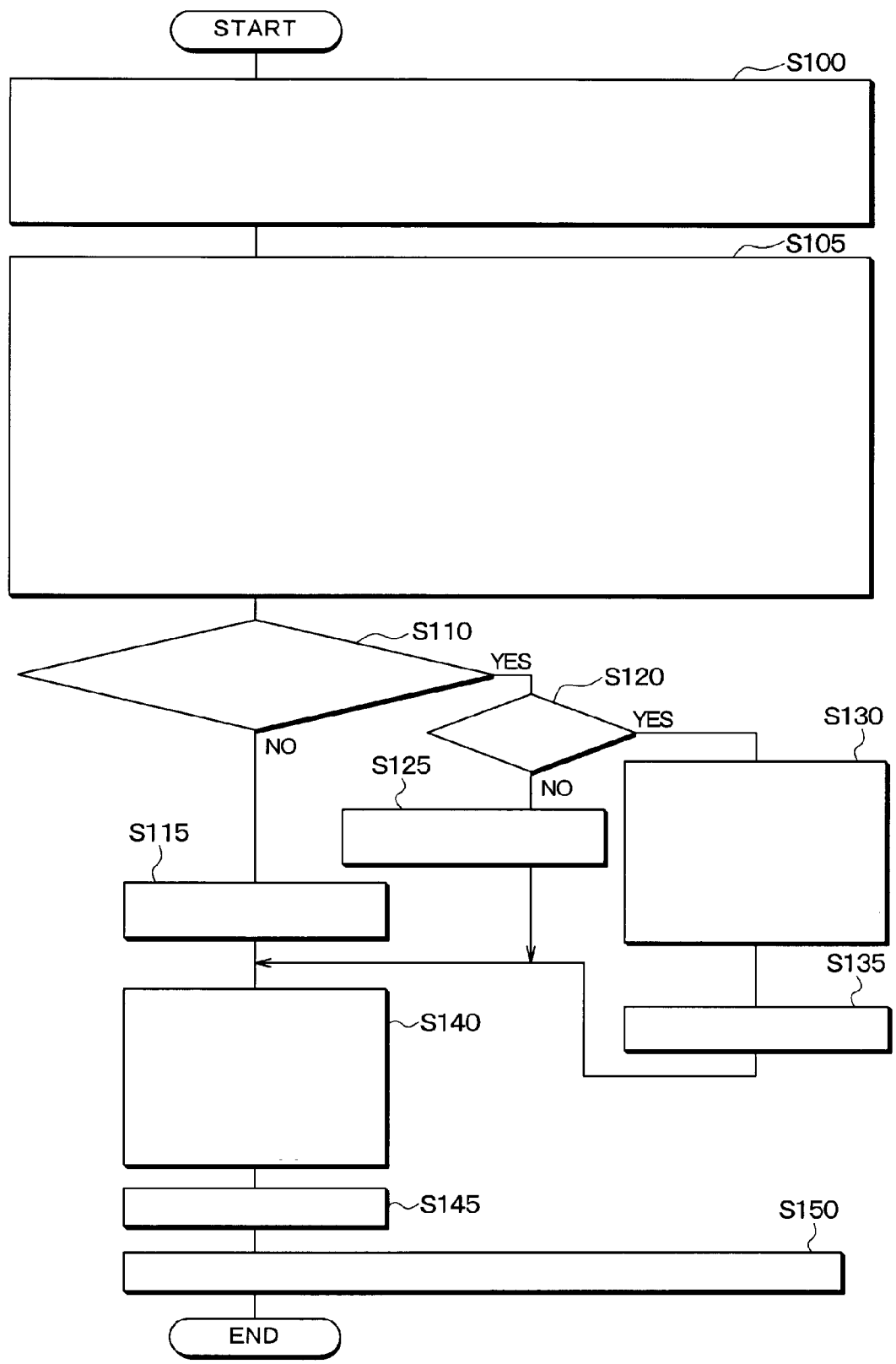
FIG. 3A is a flowchart of detailed target pressure set processing.

FIG. 3A is a flowchart of detailed target pressure set processing performed by the brake ECU 50 according to the present embodiment. The target pressure set processing will be described in detail below with reference to this figure. This target pressure set processing is performed at each predetermined control period if traction control is performed with occurrence of acceleration slip and a deviation between vehicle velocity and target vehicle velocity set by adding a predetermined control threshold to the vehicle velocity exceeds a traction control start threshold, for example.

Input processing is initially performed in step 100. This input processing includes acquiring various information referred to for traction control. Specifically, the input processing includes calculating respective wheel velocity values VWFR, VWFL, VWRR, and VWRL from detection signals of the wheel velocity sensors 51a to 51d. The input processing also includes calculating respective wheel acceleration values DVWFR, DVWFL, DVWRR, and DVWRL from differential values (e.g. differences between current values and preceding values) of the respective wheel velocity values VWFR, VWFL, VWRR, and VWRL. The input processing further includes obtaining vehicle longitudinal acceleration Gx from a detection signal of the acceleration sensor 53 and acquiring respective wheel driving torque values TRQFR, TRQFL, TRQRR, and TRQRL from the drive system.

Basic calculation processing is subsequently performed in step 105. This basic calculation processing includes calculating a wheel-cylinder pressure control amount required for inhibition of acceleration slip of each wheel during traction control, i.e. an acceleration slip required hydraulic pressure of each wheel DSLIP_P corresponding to a target pressure. Reference sign  indicates FL, FR, RL, or RR corresponding to a control target wheel.

Specifically, for calculation of the acceleration slip required hydraulic pressure of each wheel DSLIP_P, driving torque calculation and wheel slip feedback calculation are performed and control amount calculation is performed in accordance with calculation results, to obtain the acceleration slip required hydraulic pressure of each wheel DSLIP_P.

The driving torque calculation includes initially calculating acceleration slip torque of each wheel DSlipTrq. Typical traction control includes calculating a target pressure as a control amount in accordance with a deviation between target vehicle velocity and vehicle velocity as well as with acceleration and setting a subsequent control amount with feedback of an actual wheel-cylinder pressure actually generated when a wheel-cylinder pressure is controlled to follow the target pressure. Meanwhile, the acceleration slip torque of each wheel DSlipTrq is calculated herein by multiplying a wheel inertia moment I as an inertia moment of vehicle rotary members including wheels (e.g. wheels and an axle) and angular velocity α of the rotary members obtained by subtracting the longitudinal acceleration Gx from acceleration of each wheel DVW(=I×α) in accordance with a wheel rotation motion equation. As described above, the target pressure can be set more quickly not by feeding back the actual wheel-cylinder pressure but by calculating the acceleration slip torque of each wheel DSlipTrq with feedforward in accordance with the rotation motion equation.

Also surplus torque of each wheel SurplusTrq(=TRQ-Iv×Gx-R) is calculated by subtracting a value obtained by multiplying a moment Iv for vehicle acceleration and the longitudinal acceleration Gx (Iv×Gx) and subtracting travel resistance R from driving torque of each wheel TRQ. The calculation result possibly has a negative value and thus has the minimum value set to 0 (Nm) as a lower limit guard. The driving torque calculation is performed in this manner. The target pressure can be set more quickly because the surplus torque of each wheel SurplusTrq can be calculated with feedforward even in the case where the surplus torque of each wheel SurplusTrq** is referred to.

The subsequent wheel slip feedback calculation includes calculating a control value for continuous acceleration slip by feeding back the acceleration slip. Specifically, continuous acceleration slip possibly causes changes in friction coefficient of a brake pad, tire performance, and the like. The target pressure is thus preferred to be increased in correspondence with the changes by feeding back the acceleration slip so as to cope with such a case. A control value to be fed back is calculated in accordance with the changes caused by the acceleration slip.

Initially a slip amount SlipVW is calculated by acceleration slip. Specifically, the slip amount SlipVW(=VW-V0-TV) is calculated by subtracting vehicle velocity V0 and a target velocity deviation TV for traction control from each wheel velocity VW. Subsequently, slip control amount torque SlipFB(n) is calculated as torque required for achieving the slip amount SlipVW. Reference sign n indicates that the value is obtained at the current control period. Specifically, the slip control amount torque SlipFB(n) (=SlipFB(n-1)+ SlipVW×control gain) is calculated by adding a value obtained by multiplying the slip amount SlipVW and a preset control gain to slip control amount torque SlipFB** (n-1) obtained at the preceding control period. The wheel slip feedback calculation is performed in this manner.

The control amount calculation includes initially calculating slip inhibition torque of each wheel SlipControlTrq as torque required for inhibiting slip of each wheel. Specifically, the slip inhibition torque of each wheel SlipControlTrq is calculated by adding the smaller one of the acceleration slip torque of each wheel DSlipTrq and the surplus torque of each wheel SurplusTrq calculated in the driving torque calculation to the slip control amount torque SlipFB(n). This calculation sets a target pressure in proportion to the acceleration slip torque of each wheel DSlipTrq or the surplus torque of each wheel SurplusTrq**.

The acceleration slip required hydraulic pressure of each wheel DSLIP_P is calculated by converting the calculated slip inhibition torque of each wheel SlipControlTrq to a hydraulic pressure. The slip inhibition torque of each wheel SlipControlTrq** can be made variable in accordance with vehicle velocity increase. A driver has intension of acceleration when vehicle velocity is increasing. The driver may not have acceleration feeling during braking but may receive brake dragging feeling. In view of this, a conversion coefficient referred to for hydraulic pressure conversion can be made smaller as vehicle velocity increases in order to decrease braking torque in accordance with vehicle velocity increase. The control amount calculation is performed in this manner to end the basic calculation processing.

Subsequently performed in steps 110 to 135 is the filter regulation processing of regulating a filter coefficient K1 for the hydraulic-pressure-increase filter and the hydraulic-pressure-decrease filter. Initially determined in step 110 is whether or not the acceleration slip required hydraulic pressure of each wheel DSLIP_P calculated at the current control period is less than an acceleration slip required hydraulic pressure of each wheel DSLIP_PFilter(n-1) after filtering, which is set finally at the preceding control period. The acceleration slip required hydraulic pressure of each wheel DSLIP_P**Filter(n-1) has a value set in step 150 to be described later at the preceding control period. This determination relates to whether the current control decreases or increases the target pressure. Negative determination indicates increasing the target pressure, whereas positive determination indicates decreasing the same.

The flow proceeds to step 115 in the case of negative determination indicating increasing the target pressure in step 110. The filter coefficient K1 is set to a large value such as 1.0 for quicker increase in target pressure. Specifically, when increasing the target pressure, the effect of inhibiting the change of the target pressure by the hydraulic-pressure-increase filter is made smaller for a quicker change of target pressure. Also performed is updating grip time to 0, the grip time being obtained by measuring time while the wheel ** is in a gripping state after acceleration slip is cancelled. The flow then proceeds to step 140 to be described later.

In contrast, the flow proceeds to step 120 if positive determination indicating decreasing the target pressure is made in step 110, to determine whether or not the slip amount SlipVW is less than 0. If the slip amount SlipVW is less than 0, slip is almost cancelled and the wheel is in the gripping state.

The flow proceeds to step 125 if negative determination is made in step 120. The filter coefficient K1 is set to a small value such as 0.01 to suppress decrease in target pressure because slip has not yet been cancelled. When decreasing the target pressure, the effect of inhibiting the change of the target pressure by the hydraulic-pressure-decrease filter is made smaller than that by the hydraulic-pressure-increase filter for a slower target pressure change. The flow then proceeds to step 140.

The flow proceeds to step 130 if positive determination is made in step 120, and the filter coefficient K1 is obtained in accordance with the grip time. Acceleration slip has been already cancelled and the wheel is in the gripping state in this case. The filter coefficient K1 is set to be larger than that for the case before acceleration slip is cancelled, for a quicker target pressure change. In the case where the wheel grips in comparison to the case where the wheel slips, the difference between the effect of inhibiting the change of the target pressure by the hydraulic-pressure-increase filter and the effect of inhibiting the change of the target pressure by the hydraulic-pressure-decrease filter is made smaller in the filter regulation processing. Specifically, the filter coefficient K1 is made gradually larger as the grip time is longer. If the grip time is short, the filter coefficient K1 is made smaller for moderate target pressure decrease. The relation between the grip time and the filter coefficient K1 is obtained preliminarily through an experiment or the like. As exemplified in the figure, the filter coefficient K1 is set to 0.01 until the grip time reaches a predetermined length, whereas the filter coefficient K1 is increased to gradually approach to 1 in accordance with increase in grip time after elapse of predetermined time. The flow subsequently proceeds to step 135 to increment the grip time by 1, and then proceeds to step 140.

A filter coefficient K2 corresponding to the vehicle velocity V0 is set in step 140. As described in step 105, a conversion coefficient for conversion of the slip inhibition torque of each wheel SlipControlTrq to a hydraulic pressure can be made smaller so as to decrease braking torque in accordance with vehicle velocity increase in the calculation of the acceleration slip required hydraulic pressure of each wheel DSLIP_P. The same effect can be achieved also by setting a filter coefficient. The filter coefficient K2 is made larger as the vehicle velocity V0 increases in step 140. The target pressure can be increased or decreased more quickly as the vehicle velocity V0 increases in this case. This improves responsiveness and prevents a driver from receiving brake dragging feeling.

The flow then proceeds to step 145. The filter coefficient K1 set in step 115, 125, or 135 and the filter coefficient K2 set in step 140 are compared with each other and a larger one is set as a final filter coefficient K.

The flow then proceeds to step 150 to calculate an acceleration slip required hydraulic pressure of each wheel DSLIP_PFilter(n) at the current control period. In a case where filtering is performed with a primary low pass filter, added are a value obtained by multiplying the current acceleration slip required hydraulic pressure of each wheel DSLIP_P and the filter coefficient K and a value obtained by multiplying the preceding acceleration slip required hydraulic pressure of each wheel DSLIP_PFilter(n−1) and (1−K). The acceleration slip required hydraulic pressure of each wheel DSLIP_PFilter(n) can be calculated accordingly. Exemplified herein is the case of performing filtering with a primary low pass filter. Filtering can be performed in accordance with an alternative method, with a butterworth filter, for example.

Calculated in this manner is the acceleration slip required hydraulic pressure of each wheel DSLIP_PFilter(n) corresponding to the target pressure at the current control period. The brake ECU 50 controls the respective control valves 20 and 30 to 33 and the motor 11** in order to obtain such a target pressure. This achieves inhibition of acceleration slip of a driving wheel as a control target wheel.

Figure 4:
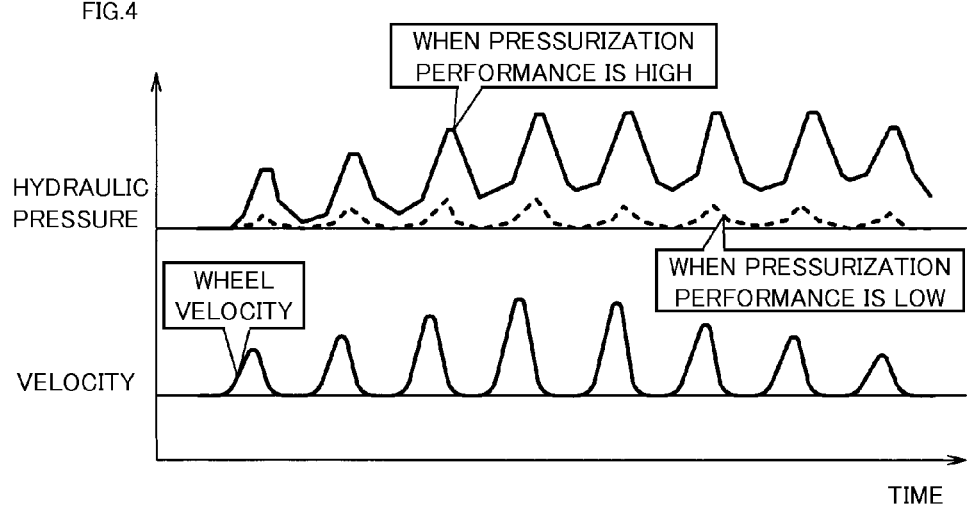
FIG. 4 is a timing chart of traction control performed in accordance with a conventional method.
Figure 5:
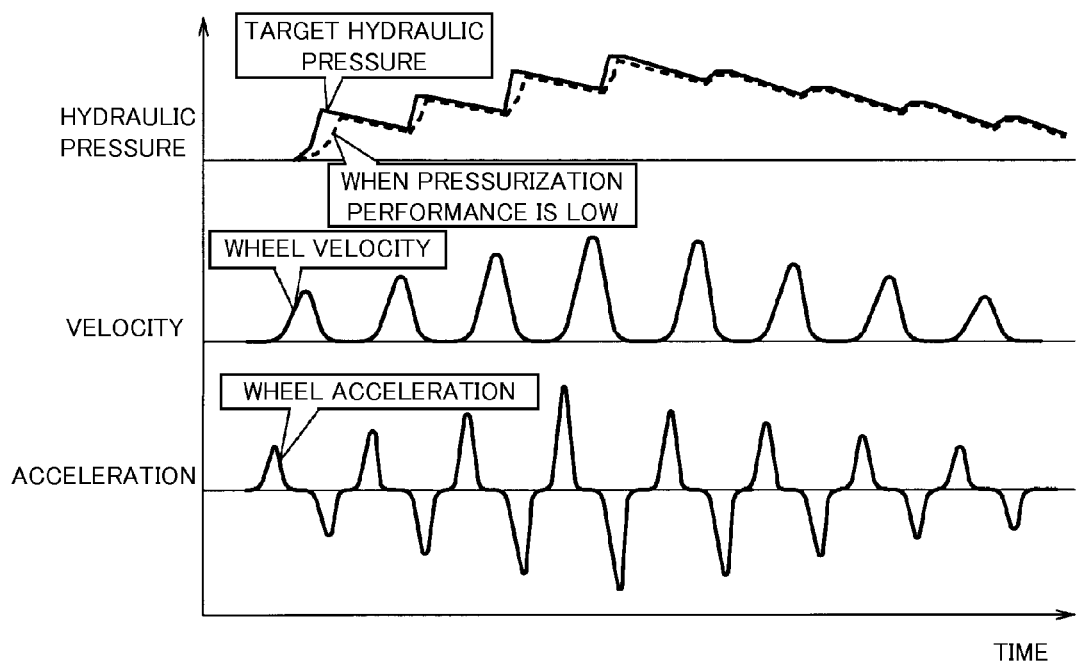
FIG. 5 is a timing chart of traction control performed in accordance with a method of the first embodiment.
Figure 7C:
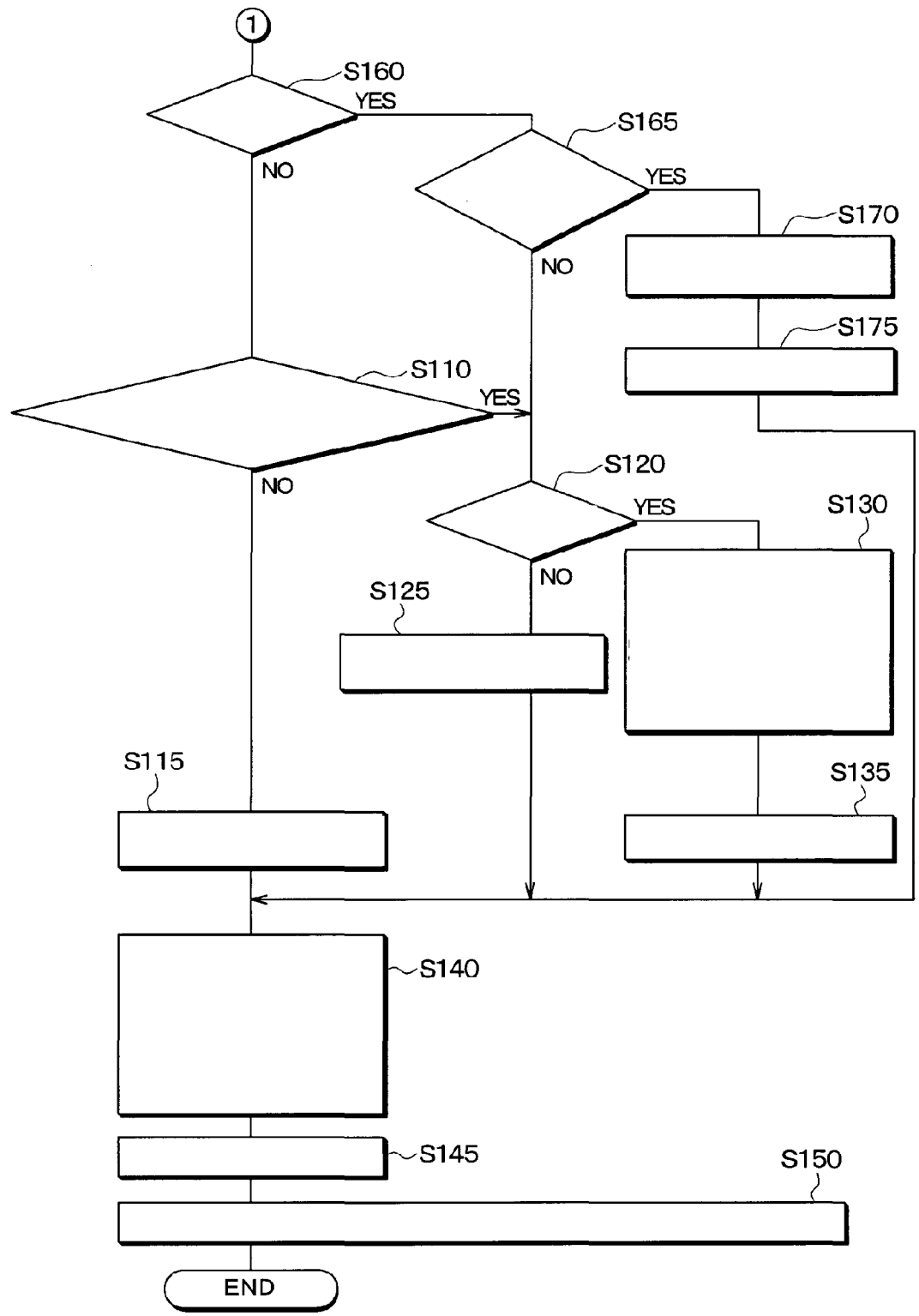
FIG. 7C is a flowchart subsequent to FIG. 7A, of the detailed target pressure set processing including the target hydraulic pressure reset processing.

FIGS. 4 and 5 are timing charts of traction control performed in accordance with a conventional method and the method of the present embodiment, respectively.

As indicated in FIG. 4, in the conventional method, a target pressure is set accordingly when acceleration slip occurs with excessive wheel velocity increase relative to target velocity, and the motor and the control valves are controlled for generation of a wheel-cylinder pressure. The wheel-cylinder pressure can be increased or decreased with a high degree of responsiveness in accordance with wheel velocity increase if pump pressurization has high pressurization capacity. However, the wheel-cylinder pressure cannot be increased or decreased with a high degree of responsiveness in accordance with wheel velocity increase if pump pressurization has low pressurization capacity. In this case, the acceleration slip cannot be inhibited sufficiently and intended traction control cannot be performed.

A motor operation frequency can be reduced by performing ON-OFF control of the motor so as to turn ON the motor for increasing a wheel-cylinder pressure and turn OFF the motor for decreasing a wheel-cylinder pressure. This case requires time from the motor starts being driven until the pump sucks or discharges brake fluid. The wheel-cylinder pressure cannot be increased or decreased with a high degree of responsiveness if pump pressurization has low pressurization capacity.

As indicated in FIG. 5, in the method according to the present embodiment, similarly to the conventional method, a target pressure is set accordingly when acceleration slip occurs with excessive wheel velocity increase relative to target velocity and the control valves and the like are controlled for generation of a wheel-cylinder pressure. The target pressure is changed quickly to increase the wheel-cylinder pressure but is changed slowly to decrease the wheel-cylinder pressure. Accordingly, even if the target pressure is decreased after the actual wheel-cylinder pressure is increased to follow the target pressure, the actual wheel-cylinder pressure decreases only gradually. This reduces a pressure increase amount required to increase the wheel-cylinder pressure to the target pressure when the target pressure is increased subsequently. The wheel-cylinder pressure can thus be increased sufficiently to reach the target pressure with a high degree of responsiveness in a case where pump pressurization has high pressurization capacity as well as in a case where pump pressurization has low pressurization capacity.

As described above, for traction control according to the present embodiment, the different filters, i.e. the hydraulic-pressure-increase filter and the hydraulic-pressure-decrease filter, are provided for increasing and decreasing a target pressure, respectively. The effect of inhibiting the change of the target pressure by the hydraulic-pressure-increase filter is made smaller than the effect of inhibiting the change of the target pressure by the hydraulic-pressure-decrease filter, so that the target pressure is increased quickly but is decreased slowly.

Accordingly, even if the target pressure is decreased after the actual wheel-cylinder pressure is increased to follow the target pressure, the actual wheel-cylinder pressure decreases only gradually. This reduces a pressure increase amount required to increase the wheel-cylinder pressure to the target pressure when the target pressure is increased subsequently. The wheel-cylinder pressure can thus be increased sufficiently to reach the target pressure with a high degree of responsiveness in a case where pump pressurization has high pressurization capacity as well as in a case where pump pressurization has low pressurization capacity. It is accordingly possible to inhibit the wheel-cylinder pressure from failing to increase accurately due to low pressurization performance. Braking force can be generated with a high degree of responsiveness even in a case where a tire repeats slipping and gripping on a dirt road or the like, because the wheel-cylinder pressure can be increased accurately. Sufficient travel performance can thus be achieved even in a case where pump pressurization has low pressurization capacity.

Different Embodiment

The present invention is not limited to the embodiment described above but can be modified appropriately within the scope of the claims.

In step 105 in FIGS. 3A and 3B of the above embodiment, the slip inhibition torque of each wheel SlipControlTrq is calculated by adding the smaller one of the acceleration slip torque of each wheel DSlipTrq and the surplus torque of each wheel SurplusTrq to the slip control amount torque SlipFB(n). Alternatively, the slip inhibition torque of each wheel SlipControlTrq can be calculated by adopting only one of these values and adding it to the slip control amount torque SlipFB(n).

A system configured to obtain the driving torque of each wheel TRQ can accurately obtain the surplus torque of each wheel SurplusTrq. A target pressure can thus be set accurately in accordance with the obtained value. When the system configured to obtain the driving torque of each wheel TRQ can accurately obtain the surplus torque of each wheel SurplusTrq, braking torque corresponding to the surplus can be obtained accurately. There is thus no need to slow down the target pressure change with improvement in inhibition effect by the hydraulic-pressure-decrease filter for target pressure decrease.

The acceleration slip required hydraulic pressure of each wheel DSLIP_P**Filter(n) is calculated with conversion of torque to a hydraulic pressure in the above embodiment. Control with torque is also regarded similarly to substantial control in accordance with a target pressure after conversion to a hydraulic pressure.

The filter regulation processing of decreasing the effect of inhibiting the change of the target pressure by the hydraulic-pressure-increase filter so as to be smaller than that by the hydraulic-pressure-decrease filter is performed in the above embodiment so as to be applicable to a case where pump pressurization has low pressurization performance. The filter regulation processing can be obviously performed regardless of the pressurization performance of pump pressurization. When pump pressurization is performed in the regular control state for controlling with regular pressurization performance and in the inhibited control state with lower pressurization performance, e.g. when the motor 11 is continuously kept ON (fully ON) and is controlled to be turned ON and OFF, pressurization performance is lower in the ON-OFF control case rather than the fully ON case. It is thus preferred to perform the filter regulation processing in the ON-OFF control case because the brake hydraulic pressure of the hydraulic pressure brake mechanism can reach the target pressure with a high degree of responsiveness. The filter regulation processing can be performed in the both cases of controlling pump pressurization with regular pressurization performance in the regular control state and with lower pressurization performance in the inhibited control state, and the difference can be made larger between the effect of inhibiting the change of the target pressure by the hydraulic-pressure-increase filter and the effect of inhibiting the change of the target pressure by the hydraulic-pressure-decrease filter in the latter case rather than the former case. Also in this configuration, the brake hydraulic pressure of the hydraulic pressure brake mechanism can reach the target pressure with a high degree of responsiveness in the inhibited control state as well as in the regular control state.

The above embodiment exemplifies traction control as control for causing a wheel-cylinder pressure to follow a target pressure. The present invention is also applicable to different control if the control relates to vehicle brake control with a target pressure repeating increasing and decreasing.

In the above embodiment, the filter coefficient K1 is made larger with elapse of time, assuming that slip has been cancelled if the slip amount SlipVW is less than 0 (zero) to prevent application of excessive braking force in a case where wheel slip has been cancelled. The target pressure reset processing can be alternatively performed to decrease the acceleration slip required hydraulic pressure of each wheel DSLIP_PFilter as a target hydraulic pressure.

Specifically, as indicated in FIG. 6(a), a wheel can tend to be locked if braking force continuously increases toward a high target hydraulic pressure in spite of decreasing wheel slip. As indicated in FIG. 6(b), if wheel acceleration DV becomes less than 0 and wheel slip is decreasing, the acceleration slip required hydraulic pressure of each wheel DSLIP_PFilter as a target hydraulic pressure is once set to an actual wheel-cylinder pressure WC** as an actual hydraulic pressure. This prevents continuous increase in braking force toward a high target hydraulic pressure and application of excessive braking force in a case where slip has been cancelled, in spite of decreasing wheel slip.

The value decreasing the acceleration slip required hydraulic pressure of each wheel DSLIP_PFilter as a target hydraulic pressure in the target hydraulic pressure reset processing is not limited to the actual wheel-cylinder pressure WC but can be an actual hydraulic pressure equivalent value obtained by adding or subtracting a predetermined deviation including 0 to or from the actual wheel-cylinder pressure WC**.

The actual wheel-cylinder pressure WC can be detected directly with a pressure sensor that is provided on the conduit line A2 connected to the wheel-cylinders 4 and 5 or to the wheel-cylinder 4 or 5. The actual wheel-cylinder pressure WC can alternatively be set to an estimated value obtained in accordance with a known method from pressure increasing and decreasing time, output from the differential pressure control valve 20, output from the motor, and the like.

As depicted in FIGS. 7A, 7B, 7C and 7D, the target hydraulic pressure reset processing can be achieved by adding simple determination processing in steps 160 to 175 to the flow depicted in FIG. 3A. Specifically, determined in step 160 is whether or not the wheel acceleration DV is less than 0. Wheel acceleration slip is decreasing if positive determination is made in step 160. Determined in step 165 in this case is whether or not acceleration slip required hydraulic pressure of each wheel DSLI_P is larger than the actual wheel-cylinder pressure WC. This prevents the acceleration slip required hydraulic pressure of each wheel DSLI_P from being set to a large value. The flow transitions to step 170 if positive determination is made in step 165. In this case, the acceleration slip required hydraulic pressure of each wheel DSLIP_P is set to the actual wheel-cylinder pressure WC. The filter coefficient K1 is set to 1 in step 175. The flow then transitions to step 140. If wheel acceleration is less than 0 and wheel slip is decreasing, the acceleration slip required hydraulic pressure of each wheel DSLIP_P is once set to the actual wheel-cylinder pressure WC and the acceleration slip required hydraulic pressure of each wheel DSLIP_PFilter as a target hydraulic pressure is also set to the actual wheel-cylinder pressure WC.

If negative determination is made in step 165, the acceleration slip required hydraulic pressure of each wheel DSLIP_P has decreased to the actual wheel-cylinder pressure WC. The hydraulic-pressure-decrease filter is set to be small so as to prevent excessive decrease in hydraulic pressure as in the above embodiment. Remaining operation is similar to that according to the embodiment indicated in FIGS. 6(*a*) and 6(*b*), and description thereof will not be repeated herein.

In the above embodiment, the brake ECU 50 corresponds to the hydraulic pressure setting means according to the present invention, and the steps depicted in the figures correspond to functional units configured to perform various processing. For example, the unit configured to perform the processing in step 115 corresponds to the hydraulic-pressure-increase filter, whereas the unit configured to perform the processing in steps 125 and 130 corresponds to the hydraulic-pressure-decrease filter.

REFERENCE SIGNS LIST

1 Brake pedal
3 Master-cylinder
10 Pump
11 Motor
20 Differential pressure control valve
30, 31 Pressure increase control valve
32, 33 Pressure decrease control valve
40 Pressure regulating valve
50 Brake ECU
51*a* to 51*d* Wheel velocity sensor
53 Acceleration sensor

The invention claimed is:

1. A vehicular brake control device comprising:
a hydraulic pressure brake mechanism provided at each wheel of a vehicle and configured to generate braking force in accordance with a brake hydraulic pressure;
a hydraulic pressure control means including a pump and a motor configured to drive the pump, and configured to drive the motor, operate the pump, and control the brake hydraulic pressure generated at the hydraulic pressure brake mechanism to an appropriate hydraulic pressure; and
a hydraulic pressure setting means configured to set a target pressure as a target of control by the hydraulic pressure control means, for the brake hydraulic pressure generated at the hydraulic pressure brake mechanism; wherein
the hydraulic pressure control means has 1) a regular control state for controlling increase of the brake hydraulic pressure with regular pressurization performance, and 2) an inhibited control state with pressurization performance lower than the pressurization performance in the regular control state, to increase the brake hydraulic pressure,
the hydraulic pressure setting means includes a hydraulic-pressure-increase filter configured to regulate increase of the target pressure in accordance with an increasing change of the target pressure, and a hydraulic-pressure-decrease filter configured to regulate decrease of the target pressure in accordance with a decreasing change of the target pressure, and performs, in the inhibited control state, filter regulation processing of setting an effect of inhibiting the change of the target pressure by the hydraulic-pressure-increase filter to be lower than an effect of inhibiting the change of the target pressure by the hydraulic-pressure-decrease filter,
the inhibited control state is brought for traction control of inhibiting acceleration slip of the wheel, and
the hydraulic pressure setting means performs the filter regulation processing in the inhibited control state to increase, in comparison to the regular control state, a difference between the effect of inhibiting the change of the target pressure by the hydraulic-pressure-increase filter and the effect of inhibiting the change of the target pressure by the hydraulic-pressure-decrease filter.

2. The vehicular brake control device according to claim 1, wherein the target pressure is set in proportion to surplus torque of the wheel calculated based on vehicle acceleration torque that is calculated from driving torque for driving the wheel and vehicle longitudinal acceleration and on travel resistance torque.

3. The vehicular brake control device according to claim 1, wherein, when the wheel grips, in comparison to a case where the wheel has the acceleration slip, the hydraulic pressure setting means performs the filter regulation processing to decrease the difference between the effect of inhibiting the change of the target pressure by the hydraulic-pressure-increase filter and the effect of inhibiting the change of the target pressure by the hydraulic-pressure-decrease filter.

4. The vehicular brake control device according to claim 3, wherein
the hydraulic pressure setting means measures a grip time, the grip time being obtained by measuring time while the wheel is in a gripping state after acceleration slip is cancelled, and
the hydraulic pressure setting means performs the filter regulation processing to decrease the difference between the effect of inhibiting the change of the target pressure by the hydraulic-pressure-increase filter and the effect of inhibiting the change of the target pressure by the hydraulic-pressure-decrease filter as the grip time becomes longer.

5. The vehicular brake control device according to claim 1, wherein, when the vehicle has high velocity, in comparison to a case where the vehicle has low velocity, the hydraulic pressure setting means performs the filter regulation processing to decrease the difference between the effect of inhibiting the change of the target pressure by the hydraulic-pressure-increase filter and the effect of inhibiting the change of the target pressure by the hydraulic-pressure-decrease filter.

6. The vehicular brake control device according to claim 1, wherein the hydraulic pressure setting means sets the target pressure to an actual hydraulic pressure equivalent value determined in accordance with the brake hydraulic pressure when the acceleration slip of the wheel is decreasing.

* * * * *